(12) United States Patent
Albrecht et al.

(10) Patent No.: US 9,175,126 B2
(45) Date of Patent: Nov. 3, 2015

(54) HYDROPHILIC POLYISOCYANATES

(75) Inventors: Evelyn Albrecht, Recklinghausen (DE);
Emmanouil Spyrou, Schermbeck (DE);
Annegret Lilienthal, Dorsten (DE);
Andre Raukamp, Rosendahl-Holtwick (DE); Dirk Hoppe, Nottuln (DE); Dirk Kuppert, Aschaffenburg (DE); Joachim Venzmer, Essen (DE); Frank Schubert, Neukirchen-Vluyn (DE); Michael Ferenz, Essen (DE)

(73) Assignee: Evonik Degussa GmbH, Essen (DE)

( * ) Notice: Subject to any disclaimer, the term of this patent is extended or adjusted under 35 U.S.C. 154(b) by 287 days.

(21) Appl. No.: 13/642,762

(22) PCT Filed: May 18, 2011

(86) PCT No.: PCT/EP2011/058012
§ 371 (c)(1),
(2), (4) Date: Oct. 22, 2012

(87) PCT Pub. No.: WO2011/144644
PCT Pub. Date: Nov. 24, 2011

(65) Prior Publication Data
US 2013/0041102 A1    Feb. 14, 2013

(30) Foreign Application Priority Data
May 21, 2010 (DE) .................. 10 2010 029 235

(51) Int. Cl.
| | |
|---|---|
| *C08G 18/00* | (2006.01) |
| *C08G 18/08* | (2006.01) |
| *C08G 18/28* | (2006.01) |
| *C08L 75/00* | (2006.01) |
| *C08L 75/08* | (2006.01) |
| *C08L 75/04* | (2006.01) |
| *C09D 175/08* | (2006.01) |
| *C09D 175/12* | (2006.01) |
| *C08G 18/79* | (2006.01) |
| *C08L 75/12* | (2006.01) |
| *C08G 18/70* | (2006.01) |
| *C09D 175/04* | (2006.01) |

(52) U.S. Cl.
CPC .......... *C08G 18/288* (2013.01); *C08G 18/0814* (2013.01); *C08G 18/0823* (2013.01); *C08G 18/0828* (2013.01); *C08G 18/283* (2013.01); *C08G 18/2865* (2013.01); *C08G 18/2895* (2013.01); *C08G 18/706* (2013.01); *C08G 18/79* (2013.01); *C08L 75/04* (2013.01); *C08L 75/08* (2013.01); *C08L 75/12* (2013.01); *C09D 175/04* (2013.01); *C09D 175/08* (2013.01); *C09D 175/12* (2013.01)

(58) Field of Classification Search
CPC ............. C08G 18/288; C08G 18/0823; C08G 18/0828; C08G 18/283; C08G 18/706; C08G 18/0814; C08G 18/79; C08G 18/2865; C08G 18/2895; C08L 75/04; C08L 75/08; C08L 75/12; C09D 175/04; C09D 175/08; C09D 175/12
USPC ........... 524/589, 590, 591, 839, 840; 528/44, 528/85
See application file for complete search history.

(56) References Cited

U.S. PATENT DOCUMENTS

| | | | |
|---|---|---|---|
| 4,663,377 A * | 5/1987 | Hombach et al. ............ | 524/196 |
| 6,207,289 B1 | 3/2001 | Hoffmann et al. | |
| 2008/0097025 A1 | 4/2008 | Spyrou et al. | |
| 2008/0269415 A1 | 10/2008 | Spyrou et al. | |
| 2008/0274394 A1 | 11/2008 | Schormann et al. | |
| 2009/0209711 A1 | 8/2009 | Jono et al. | |
| 2010/0168329 A1 | 7/2010 | Hoppe et al. | |
| 2010/0222540 A1 | 9/2010 | Raukamp et al. | |
| 2010/0249310 A1 | 9/2010 | Spyrou | |
| 2012/0313031 A1 | 12/2012 | Hoppe et al. | |

FOREIGN PATENT DOCUMENTS

| | | |
|---|---|---|
| JP | 2001 213937 | 8/2001 |
| JP | 2008 038112 | 2/2008 |

OTHER PUBLICATIONS

International Search Report Issued Aug. 23, 2011 in PCT/EP11/58012 Filed May 18, 2011.
U.S. Appl. No. 13/810,670, filed Jan. 17, 2013, Hoerpel, et al.

* cited by examiner

*Primary Examiner* — Patrick Niland
(74) *Attorney, Agent, or Firm* — Oblon, McClelland, Maier & Neustadt, L.L.P.

(57) ABSTRACT

The invention relates to water-soluble or water-dispersible, hydrophilic polyisocyanates and polyisocyanate mixtures, to a process for preparing them, and to their use as a starting component in the production of polyurethane polymers, more particularly as crosslinkers for water-soluble or water-dispersible film-forming binders, adhesives binders, or sealant binders or binder components with or without groups which are reactive towards isocyanate groups.

24 Claims, No Drawings

HYDROPHILIC POLYISOCYANATES

The invention relates to water-soluble or water-dispersible, hydrophilic polyisocyanates and polyisocyanate mixtures, to a process for preparing them, and to their use as a starting component in the production of polyurethane polymers, more particularly as crosslinkers for water-soluble or water-dispersible film-forming binders, adhesives binders, or sealant binders or binder components with or without groups which are reactive towards isocyanate groups.

For the purpose of simplifying the description of the present invention, the term "polyisocyanate" also stands below, synonymously, for diisocyanates and for mixtures of different polyisocyanates.

Against the background of an increasingly more stringent environmental legislation, recent years have seen an increase in importance of water-dispersible polyisocyanates for various application fields. They presently find use in particular as crosslinker components for water-thinnable two-component polyurethane paints (2K PU paints) at a high quality level, or as additives for aqueous dispersion-based adhesives. They serve for the crosslinking of aqueous dispersions in the finishing of textiles and of leather, or of formaldehyde-free textile printing inks, and are also suitable, furthermore, for example, as wet strengthening auxiliaries for paper, as disclosed in EP 0 959 087, for example.

For the preparation of water-dispersible, hydrophilic polyisocyanates there are a host of different processes known, with a part being played by ionic modifications, among others. EP 443 138, EP 510 438 and EP 548 669, for example, describe polyisocyanate mixtures which contain chemically bonded carboxyl groups.

Although such polyisocyanates can be incorporated very finely by stirring into aqueous systems, following neutralization of the carboxyl groups, without the need for high shearing forces, their shelf life, particularly in neutralized form, is nevertheless wholly inadequate.

EP 0 703 255 describes ionically hydrophilized, water-emulsifiable polyisocyanates which as emulsifiers have reaction products from the reaction with 2-hydroxyethanesulphonic acids or 3-hydroxypropanesulphonic acid. These hydrophilizing agents, however, have a range of disadvantages. Hydroxypropanesulphonic acid, for example, is in equilibrium with its anhydride, 1,3-propanesultone, which is classed as a carcinogen. Especially on the industrial scale, therefore, it can be utilized exclusively in the form of aqueous solutions and is therefore fundamentally unsuitable as a synthesis component for the preparation of modified polyisocyanates. Furthermore, EP 0 703 255 B2 makes no comment on the stability or the processing window ("pot life") of emulsions prepared from the hydrophilic polyisocyanates.

EP 1 287 052 discloses modified polyisocyanates obtainable by reacting polyisocyanates with 2-(cyclohexylamino)ethanesulphonic acid and/or 3-(cyclohexylamino)propanesulphonic acid in the presence of a suitable neutralizing agent, giving pale-coloured products with a shelf life. In relation to the shelf life, however, all that is disclosed is that the aqueous emulsions obtainable from the hydrophilic modified polyisocyanates were still fully stable after a standing time of 5 hours. They showed neither visible $CO_2$ evolution nor instances of precipitation or sediment. No statement is made, however, concerning the actual NCO content and the reactivity of the system after 5 hours.

Used presently in practice for the great majority of applications are exclusively nonionic polyisocyanates which are hydrophilically modified using polyethers. The preparation of water-dispersible polyisocyanates of this kind is discussed comprehensively in EP 959 087, EP 206 059 and EP 540 985, for example. Despite their widespread use for a whole host of different applications, however, polyisocyanates modified with nonionic polyethers have a series of fundamental disadvantages. During dispersing, they can in many cases be incorporated homogeneously into aqueous media only with employment of considerable shearing forces. Moreover, the high polyether content, which is necessary for sufficient dispersibility particularly in the context of their use as crosslinkers in aqueous 2K PU paints, gives the resultant coatings a permanent hydrophilicity. Furthermore, the polyisocyanates thus modified have an inadequate stability ("pot life") in aqueous emulsion, while retaining their full NCO activity and reactivity. Accordingly, the time within which the hydrophilic polyisocyanates can be processed is also limited. There is therefore a desire for hydrophilic polyisocyanates which not only can be incorporated easily into water but also posses a high pot life. It was an object of the present invention, therefore to provide new, water-soluble or water-dispersible polyisocyanates which are suitable for all application fields of water-soluble or water-dispersible polyisocyanates and which are not hampered by the disadvantages of the prior art. These new polyisocyanates ought to be highly compatible with typical film-forming binders, and the aqueous emulsions of the water-dispersible polyisocyanates ought more particularly to enjoy long service lives ("pot life") and processing lives, as compared with the prior art, while at the same time retaining the full reactivity of the isocyanate groups throughout the service life. A further object was to obtain polyisocyanates which are dispersible or soluble in water much more easily, being amenable to use without recourse to external emulsifiers or to the application of high shearing forces.

Surprisingly it has been found that this object can be achieved by means of modified polyisocyanates with internal emulsifiers having a particular structure.

The present invention accordingly provides water-soluble or water-dispersible, hydrophilic polyisocyanates and polyisocyanate mixtures, a process for preparing them using specific emulsifiers, compositions comprising the hydrophilic polyisocyanates of the invention, and their use as a starting component in the production of polyurethane polymers, more particularly as crosslinkers for water-soluble or water-dispersible film-forming binders or film-forming binder components having groups which are reactive towards isocyanate groups.

The present invention provides hydrophilic, water-soluble or water-dispersible polyisocyanates having an average functionality of 2.0 to 5.0 and having an aliphatically, cycloaliphatically, araliphatically and/or aromatically attached isocyanate groups (calculated as NCO; molecular weight=42) content of 4% to 27% by weight, synthesized from A) at least one diisocyanate or polyisocyanate component having an average functionality of 2.0 to 5.0 and having an aliphatically, cycloaliphatically, araliphatically and/or aromatically attached isocyanate groups (calculated as NCO; molecular weight=42) content of 8% to 27% by weight and B) 0.3% to 25% by weight, based on the total weight of components A) and B), of at least one emulsifier of the formula B $$X\text{-}[y]\text{-}Z \qquad\qquad B$$

with

X one or more hydrophilic structural units,
y an optional spacer,
Z one or more hydrophobic structural units, and the emulsifier B comprising at least one functional group which is reactive towards isocyanate groups, and A) and B) being reacted with one another in compliance with an equivalents ratio of NCO groups to functional groups which are reactive towards NCO groups of 2:1 to 400:1.

The hydrophilic polyisocyanates of the invention constitute clear, virtually colourless polyisocyanates which can be converted easily, without using high shearing forces, into sedimentation-stable dispersions, by simple stirred incorporation into water. The outstanding dispersibility in compounds having high NCO contents and high reactivity represents an advantage in particular for the use of the polyisocyanates of the invention in aqueous 2C PU paints.

Furthermore, the NCO content of such aqueous dispersions remains stable for longer than 6 hours, with no loss of reactivity. The dispersions comprising polyisocyanates of the invention possess a large pot life and hence a long processing period.

By "water-dispersible" in the sense of the invention is meant that the hydrophilic, water-dispersible polyisocyanates, on contact with water, form a fluid within 24 hours that does not show any sign of solid particles to the eye, without optical aids. In order to check whether a polymer is water-dispersible, 100 mg of the polymer, in the form of a film 100 μm thick, are introduced into 100 ml of water (200 C) and shaken on a commercially customary shaker bench for 24 hours. If no solid particles can still be seen after shaking, but the fluid possesses a haze, the polymer is water-dispersible; in the absence of a haze, it is considered water-soluble.

For preparing the hydrophilic polyisocyanates of the invention with an internal emulsifier, A) diisocyanates or polyisocyanates A
are reacted with B) an emulsifier B having at least one isocyanate-reactive functional group, in compliance with an equivalents ratio of NCO groups to NCO-reactive groups of 2:1 to 400:1.

This emulsifier B is composed of at least 2 independent structural units having covalent bonds with one another:

$$X\text{-}[y]\text{-}Z \qquad \qquad B$$

where
X denotes one or more hydrophilic structural units,
y denotes an optional spacer, and
Z denotes one or more hydrophobic structural units.

The emulsifier B=X-[y]-Z is formed from the reaction of X', y' and Z'.

X', y' and Z' contain functional groups which are complementary with one another, and so a reaction of these functional groups leads to covalent bonds and hence to the emulsifier B of the formula X-[y]-Z.

The emulsifier B=X-[y]-Z comprises at least one or more isocyanate-reactive functional groups. Those contemplated are OH, NH, $NH_2$, SH and CH-acidic groups; those preferred are OH groups. The emulsifier preferably comprises an isocyanate-reactive functional group, more preferably an OH group. Very preferably, this NCO-reactive group is located approximately or exactly between X and Z. This NCO-reactive group may already have been present in X', y' or Z'. Preferably, however, this NCO-reactive group is formed from the reaction of X', optionally y' and Z'.

The hydrophilic structural constituent X originates from the substance class X'. X' possesses at least one functional group which is able to react with y' or Z', and—possibly after neutralization of any ionogenic (neutralizable) groups that may be present—is inherently water-soluble or water-dispersible, in other words hydrophilic, in accordance with the definition of "water-soluble" and "water-dispersible" described above.

X' can denote:
a) hydroxypolyethers which contain predominantly polyethylene glycol units. Pure polyethylene glycols conform to the empirical Formula $HO(CH_2CH_2O)_nR^1$ when n=2-100, preferably n=2-50, where $R^1$ denotes either H or an alkyl group having 1-6 C atoms;
and/or
b) one or more compounds having ionogenic groups, more particularly carboxylic acid groups, sulphonic acid groups and/or tertiary amine units. Carboxylic acids contemplated include hydroxyalkylcarboxylic acids, examples being dimethylolpropionic acid, hydroxyacetic acid, hydroxypropionic acid or hydroxybutyric acid. Sulphonic acids contemplated include, for example, hydroxyalkylsulphonic acids or hydroxypolyethersulphonic acids. Tertiary amines contemplated include, for example, hydroxyalkyl-N,N-dialkylamines of the formula $HO\text{—}R^2NR^3R^4$, where $R^2$, $R^3$ and $R^4$ independently of one another are alkyl groups having 1-18 carbon atoms, which may also be branched or may contain rings. Neutralizing agents contemplated for the acid-group-containing ionogenic groups b) include, for example, alkali metal, alkaline earth metal hydroxides or low molecular mass tertiary amines, such as trimethylamine, for example, or triethylamine.

Tertiary amines under b) are neutralized preferably with low molecular mass organic acids, such as formic acid or acetic acid, for example.

Both a) and b) have at least one or more OH, NH or $NH_2$ groups or other groups reactive towards y' or Z'. Preference is given to OH groups; an OH group is particularly preferred.

Combinations of a) and b) are also possible.

As X' component a) it is preferred to use polyalkylene oxide monoalcohols prepared starting from an alkanol. These compounds are also available commercially, examples being Polyglykol M 250, M 350, M350 PU, M 500, M 500 PU, M 750, M 1100 from Clariant. For preparing the alkanol-based polyalkylene oxide monoalcohol X' starting from an alcohol having 1-6 carbon atoms, first ethylene oxide and/or propylene oxide are addition-reacted with said alcohol. Where both alkylene oxides are employed, the addition may take place randomly, blockwise, or as a gradient. In the case of the random addition, a mixture of the desired proportions of ethylene oxide and propylene oxide is addition-reacted with the starter alcohol. In the case of the blockwise addition, the components are each addition-reacted in separate stages from one another. In the case of the gradient addition, both alkylene oxides are metered simultaneously or with a variable relative metering rate.

With preference, X' is composed exclusively of polyethylene glycol units (variant a) and is described by the formula $HO(CH_2CH_2O)_nR^1$, where $R^1$=—$(CH_2)_mCH_3$. With particular preference, m is 0-3. Here, n is 2-100, preferably n is 2-50 and more preferably n is 2-25. This preferred component X' for preparing the emulsifier B) is a polyethylene oxide monoalcohol prepared starting from an alkanol.

The optional component y' is an at least difunctional spacer which is capable of reacting both with X' and with Z'. It may be, for example, a di- or polyisocyanate, di- or polycarboxylic acid derivative, di- or polyepoxide, or a mono- or polyalkoxysilane. Mixed functionalities are conceivable as well—for example, an epoxyisocyanate, an epoxyalkoxysilane, an isocyanatosilane.

The hydrophobic structural constituent Z originates from the substance class Z'. Z' possesses at least one functional group which is able to react with y' or X', and is inherently water-insoluble, i.e. hydrophobic.

Z' can denote:
a) a hydroxyl- or amino-terminated polyether which comprises one or more different polyglycol units R'O(CRHCH$_2$O)$_n$(CH$_2$CH$_2$O)$_p$R', in which R corresponds to a hydrocarbon radical of the formula —(CH$_2$)$_m$CH$_3$, with n and m independently of one another=0-20 and p=0-5, with n greater than or equal to 4 times p, and also R' independently at each occurrence denoting either H or alkyl having 1-18 carbon atoms,
and/or
b) one or more hydroxy hydrocarbons having 1-18 carbon atoms, which may also be branched and/or may contain rings and/or heteroatoms—those contemplated include, for example, hexanol, octanol, decanol, and/or dodecanol and further homologs,
and/or
c) an alkylene oxide, which may also be branched and/or may contain rings, having at least 4 carbon atoms. Those contemplated here include, for example, butylene oxide, pentene epoxide, hexene epoxide, heptene epoxide, octene epoxide, nonene epoxide, decene epoxide, undecene epoxide, and/or dodecene epoxide and further homologs. Preference as Z' is given to epoxides (alkylene oxides c) having 8-14 carbon atoms.

All of a), b) and c) have at least one or more OH, NH or NH$_2$ groups or other groups reactive towards X' or y'. Variant c) is preferred.

In addition, combinations of a), b) and c) are possible.

An essential feature of Z' is that it is inherently not water-soluble or water-dispersible. Preferably Z' has a hydrocarbon having at least 8 carbon atoms and at least one epoxide group.

The emulsifier B=X-[y]-Z preferably comprises exactly one isocyanate-reactive group.

Described below are the particularly preferred embodiments of the emulsifiers 1) and 2):

1) X comprises a polyethylene glycol unit prepared starting from an alkanol; Z comprises a relatively long hydrocarbon radical and an alcohol group.

In this preferred embodiment, the emulsifier corresponds to the formula (I)

(with -G-D-H=Z)
where
X originates from a polyalkylene glycol monoalcohol X' prepared starting from an alkanol, as defined above, containing ethylene oxide units,
G denotes a structural element of the formula (II)

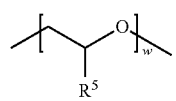

with
R$^5$=a saturated, unsaturated, branched or unbranched, substituted or unsubstituted hydrocarbon radical having at least 2 carbon atoms, preferably 6-12 carbon atoms, where R$^5$ in the radical B may be identical or different, and w is greater than or equal to one;
D=an oxyethylene radical or oxypropylene radical of the formula —(CH$_2$CHR$^6$O)$_z$—, where z is greater than or equal to 0, preferably 0-2, and R$^6$=H or CH$_3$;

H=hydrogen;
w is 1-20, preferably 1-5, more preferably 1-2.

For preparing the alkanol-based polyalkylene oxide monoalcohol X' starting from an alcohol having 1-6 carbon atoms, first ethylene oxide and/or propylene oxide are addition-reacted with said alcohol. Where both alkylene oxides are employed, the addition may take place randomly, blockwise, or as a gradient. In the case of the random addition, a mixture of the desired proportions of ethylene oxide and propylene oxide is addition-reacted with the starter alcohol. In the case of the blockwise addition, the components are each addition-reacted in separate stages from one another. In the case of the gradient addition, both alkylene oxides are metered simultaneously or with a variable relative metering rate.

With preference, X' is composed exclusively of polyethylene glycol units (variant a) and is described by the formula HO(CH$_2$CH$_2$O)$_n$R$^1$, where R$^1$=—(CH$_2$)$_m$CH$_3$. With particular preference, m is 0-3. Here, n is 2-100, preferably n is 2-50 and more preferably n is 2-25. This preferred component X' for preparing the emulsifier B) is a polyethylene oxide monoalcohol prepared starting from an alkanol.

A polyalkylene glycol monoalcohol of this kind, prepared starting from an alkanol (and corresponding to X', also available commercially, e.g. Polyglykol M 250, M 350, M350 PU, M 500, M 500 PU, M 750, M 1100 from Clariant) is introduced and is reacted, under suitable conditions known to the skilled person, with one or more epoxides having a relatively long alkyl chain, with at least 3 carbon units, preferably at least 4 carbon units. After ring opening has taken place, the resultant secondary alcohol is optionally further reacted with ethylene oxide or propylene oxide under the same conditions. This produces a molecule having a hydrophilic unit, with the radical of the polyalkylene glycol monoalcohol prepared starting from an alkanol, from X', inherently water-soluble, and a hydrophobic unit, with the radical of the epoxide with relatively long alkyl chain Y', inherently water-insoluble; during the linking of the two units, an alcohol group is formed which is needed for attachment to the polyisocyanate.

In this way, the emulsifiers B of the formula I of the preferred embodiment 1) are obtained.

2) X comprises polyether radicals and a sulphonic acid group, and Z comprises a hydrocarbon radical having 3 to 18, preferably 3 to 6, carbon atoms and an alcohol group, the emulsifiers B being termed blocklike sulphonated polyether monoalcohols.

Starting materials for preparing the blocklike sulphonated polyether monoalchols for the emulsifiers B are generally compounds of the formula HO—R$^7$, where R$^7$ is a monovalent, at least monounsaturated, aliphatic hydrocarbon radical having 3 to 18, preferably 3 to 6, carbon atoms, a preferably monounsaturated cycloaliphatic or mixed cyloaliphatic/aliphatic hydrocarbon radical having 4-10 carbon atoms or, less preferably, an aromatic or araliphatic hydrocarbon radical having a total of 8-16 carbon atoms, which has an olefinically unsaturated substituent whose double bond is not in conjugation with the aromatic ring. It is also possible, for preparing the sulphonated polyether monoalcohols, to use starting materials whose radical R$^7$ has inert substitutents, such as alkoxy radicals or halogen atoms, for example.

Examples of suitable compounds of the formula HO—R$^7$ are allyl alcohol, 1-hydroxy-Δ2,3-hexene, 1-hydroxy-Δ3,4-hexene, 1-hydroxy-Δ9,10-octadecene, cyclohexen-3-ol, monoolefinically unsaturated bicyclic addition products of cyclopentadiene that contain an alcoholic hydroxyl group, such as, for example, the compound of the formula (III)

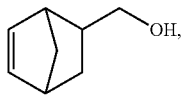

p-allylbenzyl alcohol and/or p-allylphenol.

From the exemplified starting materials HO—R$^7$, in a multi-stage reaction, the sulphonated polyether monoalcohols are then prepared. In step a), ethylene oxide and/or propylene oxide are addition-reacted on to the starting alcohol. Where both alkylene oxides are employed, the addition may take place randomly, blockwise, or as a gradient. In the case of the random addition, a mixture of the desired proportions of ethylene oxide and propylene oxide is addition-reacted with the starter alcohol. In the case of the blockwise addition, the components are each addition-reacted in separate stages from one another. In the case of the gradient addition, both alkylene oxides are metered simultaneously or with a variable relative metering rate.

In step b), the polyethers obtained under a) are reacted with epoxides of the formula IV

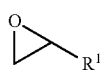

where R$^1$ is a saturated, unsaturated, branched or unbranched, substituted or unsubstituted hydrocarbon radical having at least 2 carbon atoms, particular preference being given to saturated radicals having 2-20 carbon atoms and very particular preference to saturated radicals having 2 to 12 carbon atoms. Where more than one epoxide of the formula (IV) is used for synthesizing the emulsifiers B, the synthesis may take place randomly, blockwise or else as a gradient, as described under step a).

In the optional step c), the polyethers obtained under b) are reacted with ethylene oxide, in order to convert the resultant secondary alcohol into a primary alcohol. This makes the subsequent reaction with isocyanates easier.

The addition reaction of the alkylene oxides in steps a) to c) takes place in conventional manner at temperatures from 40 to 200° C., preferably from 60 to 130° C., preferably in a closed reaction vessel and in the presence of catalysts. Suitable catalysts for the addition reaction are the basic or acidic catalysts known to the skilled person, such as alkali metal hydroxides, alkali metal alkoxides, boron trifluoride or else double-metal cyanides (DMC), for example. Besides the base-catalyzed reaction, acidic catalyses for the alkoxylation are known as well.

For instance, in DE 102004007561, the use is described of HBF4 and of Lewis acids such as BF3, AlCl3 and SnCl4, for example, in the alkoxylation technology. The base-catalyzed alkoxylation is described comprehensively in EP 0043966, for example.

In step d), the monounsaturated polyether monoalcohols obtained under step a) and b) and optionally c) are reacted with compounds of the formula HSO$_3$M. M is a metal ion or an ammonium ion, preferably an alkali metal ion. Special preference is given to the use of sodium hydrogensulphite or sodium pyrosulphite. The addition reaction is described in references including Houben-Weyl "Methoden der Organischen Chemie", Volume IX, page 380 and *Makromol. Chem.*, 191, 3045-3057 (1990). The hydrogensulphite or pyrosulphite is used in the reaction in at least an equimolar amount, based on the olefinic double bond. It is preferred to use an up to five fold excess of the sulphite. The radical addition proceeds with high yields in the presence of atmospheric oxygen at optionally moderately elevated temperatures of up to 100° C. The reaction takes place in a pH range from 4 to 10, preferably 7 to 8.5. It is clear to the skilled person that the reaction may also be carried out with other metal hydrogensulphites, such as alkaline earth metal hydrogensulphites, for example. As solvents for the addition reaction of the hydrogensulphite it is possible to use water-miscible solvents, such as alcohols, for example. Particularly preferred is the use of ethanol/water mixtures. The ratio of ethanol to water in that case is guided by the solubility of the polyether that is obtained after step a) and b) and optionally c). Particularly preferred for the reaction in step d) is the use of solutions in which the amount of polyether from step a) and b) and optionally c) is at least 10% by weight, preferably at least 20% by weight, more preferably at least 50% by weight.

In this way, the emulsifiers B of the formula I of the preferred embodiment 2) are obtained.

The emulsifiers B with the structure X—Z or X-[y]-Z are used for preparing the hydrophilically modified polyisocyanates of the invention; the reaction with polyisocyanates A) may also take place in the presence of polyalkylene oxide polyether alcohols containing ethylene oxide units, and/or the polyisocyanates A) employed may optionally already contain such units.

In particular, the reaction is preferably carried out such that
A) a diisocyanate or polyisocyanate component with an average functionality of 2.0 to 5.0, having an aliphatically, cycloaliphatically, araliphatically and/or aromatically attached isocyanate group (calculated as NCO: molecular weight=42) content of 8% to 27% by weight
is reacted with
B) 0.3 to 25.0% by weight, based on the total weight of components A) and B), of an emulsifier,
   in compliance with an equivalents ratio of NCO groups to NCO-reactive groups of 2:1 to 400:1.

The component A) for use in accordance with the invention generally has an average NCO functionality of 2.0 to 5.0, preferably of 2.3 to 4.5, typically an isocyanate groups content of 8% to 27% by weight, preferably 14.0% to 24.0% by weight, and preferably a monomeric diisocyanates content of less than 1% by weight, more preferably less than 0.5% by weight. It is composed of at least one organic diisocyanate or polyisocyanate having aliphatically, cycloaliphatically, araliphatically and/or aromatically attached isocyanate groups.

Suitable diisocyanates for preparing component A) are any desired diisocyanates obtainable by phosgenation or by phosgene-free processes, as for example by thermal urethane cleavage. Preferred diisocyanates are those of the molecular weight range 140 to 400 g/mol, having aliphatically, cycloaliphatically, araliphatically and/or aromatically attached isocyanate groups, such as, for example, 1,4-diisocyanatobutane, 1,6-diisocyanatohexane (HDI), 2-methyl-1,5-diisocyanatopentane, 1,5-diisocyanato-2,2-dimethylpentane, 2,2,4-trimethyl-1,6-diisocyanatohexane and/or 2,4,4-trimethyl-1,6-diisocyanatohexane, 1,10-diisocyanatodecane, 1,3-diisocyanatocyclohexane, 1,4-diisocyanatocyclohexane, 1,3-bis(isocyanatomethyl)cyclohexane and 1,4-bis(isocyanatomethyl)cyclohexane, 1-isocyanato-3,3,5-trimethyl-5-isocyanatomethylcyclohexane (isophorone diisocyanate, IPDI), 2,2'-diisocyanatodicyclohexylmethane, 2,4'-diisocyanatodicyclohexylmethane and/or 4,4'-diisocyanatodicyclohexylmethane (H$_{12}$MDI), 1-isocyanato-1-methyl-4(3)isocyanatomethylcyclohexane, bis(isocyanatomethyl)norbornane, 1,3- and/or 1,4-bis(2-isocyanatoprop-2-yl)benzene (TMXDI), 2,4- and/or 2,6-diisocyanatotoluene (TDI), 2,4'- and 4,4'-diisocyanatodiphenylmethane (MDI), 1,5-diisocyanatonaphthalene or any desired mixtures of such diisocyanates.

The polyisocyanates of component A) are preferably any desired polyisocyanates, synthesized from at least two diisocyanates and prepared by modification of simple aliphatic, cycloaliphatic, araliphatic and/or aromatic diisocyanates, with uretdione, isocyanurate, allophanate, biuret, urea, urethane, iminooxadiazinedione and/or oxadiazinetrione structure, of the kind described exemplarily in, for example, J. Prakt. Chem. 336 (1994) 185-200, in DE 16 70 666, DE 19 54 093, DE 24 14 413, DE 24 52 532, DE 26 41 380, DE 37 00 209, DE 39 00 053 and DE 39 28 503 or in EP 336 205, EP 339 396 and EP 798 299.

Component A) preferably comprises polyisocyanates of the stated type having exclusively aliphatically and/or cycloaliphatically attached isocyanate groups.

Especially preferred compounds as components A) are isocyanurates based on HDI, IPDI and/or H12MDI.

Besides these hydrophobic polyisocyanates, however, suitability as starting compounds A) is also possessed by polyisocyanates A) modified hydrophilically using ethylene oxide polyethers, of the kind obtainable, for example, by the processes described in EP 0 959 087.

The invention also provides a process for preparing hydrophilic, water-soluble or water-dispersible polyisocyanates having an average functionality of 2.0 to 5.0 and having an aliphatically, cycloaliphatically, araliphatically and/or aromatically attached isocyanate groups (calculated as NCO; molecular weight=42) content of 4% to 27% by weight, synthesized from A) at least one diisocyanate or polyisocyanate component having an average functionality of 2.0 to 5.0 and having an aliphatically, cycloaliphatically, araliphatically and/or aromatically attached isocyanate groups (calculated as NCO; molecular weight=42) content of 8% to 27% by weight and B) 0.3% to 25% by weight, based on the total weight of components A) and B), of at least one emulsifier of the formula B $$X\text{-}[y]\text{-}Z \qquad B$$

with
X one or more hydrophilic structural units,
y an optional spacer,
Z one or more hydrophobic structural units,
and the emulsifier B comprising at least one functional group which is reactive towards isocyanate groups,
and A) and B) being reacted with one another in compliance with an equivalents ratio of NCO groups to functional groups which are reactive towards NCO groups of 2:1 to 400:1.

For carrying out the process of the invention, the starting components A) and B) are reacted with one another, preferably in the presence of a suitable catalyst, at temperatures from 40 to 150° C., preferably 50 to 130° C., in compliance with an equivalents ratio of NCO groups to NCO-reactive groups of 2:1 to 400:1, preferably of 4:1 to 250:1, preferably until the theoretically calculated NCO content is attained.

In order to accelerate the reaction in the process of the invention, typical catalysts known from polyurethane chemistry may be used, examples being tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane, N,N'-dimethylpiperazine or metal salts such as iron (II) chloride, aluminium tri(ethyl acetoacetate), zinc chloride, zinc(II)n-octanoate, zinc(II) 2-ethyl-1-hexanoate, zinc(II) 2-ethylcaproate, zinc(II) stearate, zinc(II) naphthenate, zinc (II) acetylacetonate, tin(II) n-octanoate, tin(II) 2-ethyl-1-hexanoate, tin(II) ethylcaproate, tin(II) laurate, tin(II) palmitate, dibutyltin(IV) oxide, dibutyltin(IV) dichloride, dibutyltin (IV) diacetate, dibutyltin(IV) dimaleate, dibutyltin(IV) dilaurate, dioctyltin(IV) diacetate, molybdenum glycolate or any desired mixtures of such catalysts. It is preferred to use catalysts containing bismuth or tin.

These catalysts are employed in the process of the invention, if at all, in an amount of 0.001% to 2% by weight, preferably 0.005% to 0.5% by weight, based on the total weight of the reactants.

The process of the invention can be carried out optionally in a suitable solvent inert towards isocyanate groups. Suitable solvents are, for example, the customary paint solvents known per se, such as, for example, ethyl acetate, butyl acetate, ethylene glycol monomethyl or monoethyl ether acetate, 1-methoxyprop-2-yl acetate, 3-methoxy-n-butyl acetate, acetone, 2-butanone, 4-methyl-2-pentanone, cyclohexanone, toluene, xylene, chlorobenzene, white spirit, aromatics with relatively high degrees of substitution, of the kind, for example, traded under the names Solventnaphtha, Solvesso®, Isopar®, Nappar® (Deutsche EXXON CHEMICAL GmbH) and Shellsol® (Deutsche Shell Chemie GmbH), carbonic esters, such as dimethyl carbonate, diethyl carbonate, 1,2-ethylene carbonate and 1,2-propylene carbonate, lactones, such as propiolactone, butyrolactone, caprolactone and methylcaprolactone, but also solvents such as propylene glycol diacetate, diethylene glycol dimethyl ether, dipropylene glycol dimethyl ether, diethylene glycol ethyl and butyl ether acetate, N-methylpyrrolidone and N-methylcaprolactam, or any desired mixtures of such solvents.

The hydrophilically modified polyisocyanates of the invention constitute (as already mentioned above) clear, virtually colourless polyisocyanates which can be converted easily, without use of high shearing forces, by simple stirred incorporation into water, into sedimentation-stable dispersions. The outstanding dispersibility in compounds with high NCO contents and high reactivity constitutes an advantage particularly for the use of the polyisocyanates of the invention in aqueous 2C PU paints.

The NCO content of such aqueous dispersions continues to remain stable for longer than 6 hours, with no loss of reactivity. The dispersions comprising polyisocyanates of the invention possess a large pot life and hence a long processing period.

If desired, the hydrophilically modified polyisocyanates of the invention can be admixed, prior to emulsification, with further, non-hydrophilized polyisocyanates, more particularly paint polyisocyanates of the type specified above, and therefore likewise constitute polyisocyanates of the invention, since they are generally composed of mixtures of (i) inventively hydrophilically modified polyisocyanates and (ii) unmodified polyisocyanates of the type exemplified. In mixtures of this kind, the hydrophilically modified polyisocyanates of the invention take on the function of an emulsifier for the subsequently admixed fraction of non-hydrophilic polyisocyanates.

The invention also provides for the use of these polyisocyanates for producing polyurethane polymers, more particularly as crosslinkers for water-soluble or water-dispersible film-forming binders, adhesives binders, or sealant binders or binder components with or without groups which are reactive towards isocyanate groups, more particularly as crosslinkers for water-soluble or water-dispersible film-forming binders or film-forming binder components, more particularly also for 2C PU systems for producing coatings using aqueous coating materials based on such binders or binder components, more particularly also for 2C PU systems.

The invention, lastly, also provides for the use of these polyisocyanates in blocked form as reaction components in water-dispersible or water-dispersed film-forming binders or film-forming binder components, more particularly also for 1C PU systems.

The polyisocyanates of the invention represent valuable starting materials for the production of polyurethane polymers by the isocyanate polyaddition process.

For this purpose, the hydrophilically modified polyisocyanates of the invention are used preferably in the form of an aqueous dispersion or of emulsions, which can be reacted, in combination with water-dispersed polyhydroxyl compounds, as aqueous two-component systems (2C PU).

With particular preference, the polyisocyanates of the invention are used as crosslinkers for water-dissolved or water-dispersed film-forming binders or film-forming binder components having groups which are reactive towards isocyanate groups, more particularly alcoholic hydroxyl groups, for the production of coatings using aqueous coating materials based on such binders and/or binder components. The uniting of the crosslinker, optionally in emulsified form, with the binders or binder components can be accomplished in this case by simple stirring together, prior to the processing of the coating materials, by any desired methods, by using mechanical tools known to the skilled person, or else using two-component spray guns.

In this context, the following may be mentioned by way of example as film-forming binders or film-forming binder components: polyacrylates which are in solution or dispersion in water, contain hydroxyl groups, and come in particular from the molecular weight range from 1000 to 10 000, and constituting, with organic polyisocyanates as crosslinkers, valuable two-component binders; or polyester resins, in dispersion in water, optionally urethane-modified and containing hydroxyl groups, of the type known from polyester chemistry and alkyd resin chemistry. Suitable in principle as co-reactants for the polyisocyanate mixtures of the invention are all water-dissolved or water-dispersed binders which have isocyanate-reactive groups. These include, for example, water-dispersed polyurethanes or polyureas, which are crosslinkable with polyisocyanates by virtue of the active hydrogen atoms present in the urethane or urea groups, respectively.

In the context of their inventive use as a crosslinker component for aqueous film-forming binders, the polyisocyanates of the invention are used generally in amounts which correspond to an equivalents ratio of NCO groups to NCO-reactive groups, more particularly alcoholic hydroxyl groups, of 0.5:1 to 2:1.

Non-functional aqueous film-forming binders as well can be admixed with the polyisocyanates of the invention in minor amounts, in order to obtain very specific properties, for example as adhesion promoter additives. The polyisocyanates of the invention can of course also be used in a blocked form, blocked with blocking agents known per se from polyurethane chemistry, in combination with the abovementioned aqueous film-forming binders or film-forming binder components, as aqueous one-component PU baking systems (1C PU). Examples of suitable blocking agents include diethyl malonate, ethyl acetoacetate, acetone oximine, butanone oxime, caprolactam, 3,5-dimethylpyrazole, 1,2,4-triazole, dimethyl-1,2,4-triazole, imidazole or any desired mixtures of these blocking agents.

Suitable substrates for the aqueous coatings formulated using the polyisocyanates of the invention are any desired substrates, such as, for example, metal, wood, glass, stone, ceramic materials, concrete, rigid and flexible plastics, textiles, leather and paper, which optionally may also be provided with customary primers prior to coating. Generally speaking, the aqueous coating compositions formulated with the polyisocyanates of the invention, and admixed where appropriate with the auxiliaries and adjuvants that are customary in the coatings sector, such as flow control assistants, colour pigments, fillers, matting agents or emulsifiers, for example, have good technical film properties even on room-temperature drying. As will be appreciated, however, they can also be dried under forced conditions at elevated temperature or by baking at temperatures up to 260° C.

On account of their excellent dispersibility or emulsifiability in water, allowing homogeneous and particularly fine dispersion in aqueous film-forming binders, the use of the polyisocyanates of the invention as a crosslinker component for aqueous polyurethane paints leads to coatings having outstanding optical properties, particularly a high surface gloss, levelling and high transparency.

Besides their use as crosslinker components for aqueous 2C PU paints, the polyisocyanates of the invention are outstandingly suitable for use as crosslinkers for aqueous dispersion-based adhesives, leather coatings and textile coatings or textile printing pastes, as AOX-free papermaking assistants, or else as additives for mineral building materials, examples being concrete or mortar compositions.

On account of their outstanding dispersibility or emulsifiability in water, moreover, the polyisocyanates of the invention are also used as additives to aqueous polyurethane dispersions.

The hydrophilic polyisocyanates of the invention, processes for preparing them, and the use thereof are described by way of example below, without any intention that the invention should be confined to these exemplary embodiments. Where reference is made below to ranges, general formulae or class of compound, the intention is that these should encompass not only the corresponding ranges or groups of compounds that are explicitly mentioned, but also all sub-ranges and sub-groups of compounds that can be obtained by extraction of individual values (ranges) or compounds. Where documents are cited in the context of the present description, the intention is that their content should belong in full to the disclosure content of the present invention.

In the examples set out below, the present invention is described exemplarily, without any intention that the invention—whose scope of application is evident from the whole of the description and from the claims—should be confined to the embodiments specified in the examples.

EXAMPLES

A) Preparation of a Polyethylene Glycol Monobutyl Ether (Not Inventive)

Example 1

432.3 g of butanol and 9.45 g of sodium methoxide are introduced into a pressure reactor, which is rendered inert with nitrogen at room temperature and then evacuated. The mixture is then heated to a temperature of 115° C. 2558.2 g of ethylene oxide are metered in at 115° C. over a time of approximately 4 hours. After a subsequent reaction time of 90 minutes, the batch is cooled to 90° C., neutralized and discharged. The polyethylene glycol monobutyl ether possesses an OHN of 110 mg KOH/g.

B) Preparation of the Emulsifiers B

Example 2

Preparation of an Emulsifier B from a Polyethylene Glycol, Prepared Starting from Butanol, and a Dodecene Oxide A 3 liter autoclave is charged with 800 g of polyethylene glycol monobutyl ether (from non-inventive Example 1) and with 5.4 g of sodium methoxide, under nitrogen, and this initial charge is heated to 115° C. with stirring. The reactor is evacuated to an internal pressure of 30 mbar, in order to effect distillative removal of any volatile substances present. At 115° C., 230 g of ethylene oxide are supplied in 1 hour under a maximum internal pressure of 2 bar. After a holding time of 30 minutes, in which the internal pressure falls to <0.5 bar, 578 g of dodecene oxide are metered in over 1 hour at 115° C. Over the course of the subsequent 2-hour reaction time, the internal temperature is raised to 125° C. This if followed by the degassing stage, in which volatile fractions such as residual alkylene oxide are distilled off under reduced pressure. The polyether, which is still alkaline, is cooled to 85° C. and neutralized with aqueous phosphoric acid. This is followed by distillative removal of water at 120° C. under reduced pressure. After cooling to <90° C., the end product is discharged from the reactor via a filter.

The emulsifier obtained has an OH number of 61.6 mg KOH/g and an average molar mass of 910 g/mol. Free epoxide groups are not detectable in the end product. The acid number is 0.1 mg KOH/g.

Example 3

A 3 liter autoclave is charged with 1200 g of polyethylene glycol monobutyl ether (from non-inventive Example 1) and with 9.4 g of potassium methoxide, under nitrogen, and this initial charge is heated to 115° C. with stirring. The reactor is evacuated to an internal pressure of 30 mbar, in order to effect distillative removal of any volatile substances present. At 115° C., 440 g of ethylene oxide are supplied in 1 hour under a maximum internal pressure of 2 bar. After a holding time of 30 minutes, in which the internal pressure falls to <0.5 bar, 643 g of dodecene oxide are metered in over 45 minutes at 115° C. After a further holding time of 1 hour at 115° C., 333 g of ethylene oxide are supplied at 115° C. under a maximum internal reactor pressure of 2 bar. Over the course of the subsequent 2-hour reaction time, the internal temperature is raised to 125° C. This if followed by the degassing stage, in which volatile fractions such as residual alkylene oxide are distilled off under reduced pressure. The polyether, which is still alkaline, is cooled to 85° C. and neutralized with aqueous phosphoric acid. This is followed by distillative removal of water at 120° C. under reduced pressure. After cooling to <90° C., the end product is discharged from the reactor via a filter.

The emulsifier obtained has an OH number of 54.5 mg KOH/g and an average molar mass of 1030 g/mol. Free epoxide groups are not detectable in the end product. The acid number is 0.1 mg KOH/g.

Example 4

Preparation of a Sulphonated Polyether Monoalcohol 58 g of allyl alcohol and KOH were charged to a pressure reactor and heated to 100° C. Subsequently, over a number of hours, 360 g of propylene oxide and, after a subsequent reaction time of 1 hour, 116 of butylene oxide were metered in at 120° C. over a number of hours. After a further subsequent reaction time of 1 hour at 120° C. and after cooling to 100° C., 132 g of ethylene oxide were metered in over a number of hours. The reaction mixture was subsequently cooled to 80° C., neutralized and discharged.

900 g of the resultant polyether were dissolved in a mixture of 4000 g of distilled water and 1350 g of ethanol. Following addition of 1 g of manganese acetate*4H$_2$O, the pH of the solution was adjusted to 8 using 30% strength aqueous sodium hydroxide solution. At a temperature of 25° C., over the course of 4 hours, a solution of 236 g of sodium pyrosulphite in 944 g of water is added, with simultaneous introduction of finely divided air in quantities of 10 l per hour, the pH being maintained in a range from 7.5 to 8.5 by multiple additions of 30% strength aqueous sodium hydroxide solution. After 2 hours of subsequent reaction, neutralization is carried out with dilute phosphoric acid, and the solvent is removed by distillation. 1000 g of ethanol are added to the distillation residue, and the solids are removed by filtration. The ethanol is removed by distillation. This gives the desired monosulphonated polyether monoalcohol in the form of a viscose liquid.

Example 5

Preparation of a Sulphonated Polyether Monoalcohol 58 g of allyl alcohol and KOH were charged to a pressure reactor and heated to 100° C. Subsequently, over a number of hours, 360 g of propylene oxide and, after a subsequent reaction time of 1 hour, 360 g of butylene oxide were metered in at 120° C. over a number of hours. After a further subsequent reaction time of 1 hour at 120° C. and after cooling to 100° C., 132 g of ethylene oxide were metered in over a number of hours. The reaction mixture was subsequently cooled to 80° C., neutralized and discharged.

107 g of the resultant polyether were dissolved in a mixture of 400 g of distilled water and 300 g of ethanol. Following addition of 0.1 g of manganese acetate*4H$_2$O, the pH of the solution was adjusted to 8 using 30% strength aqueous sodium hydroxide solution. At a temperature of 25° C., over the course of 4 hours, a solution of 22 g of sodium pyrosulphite in 87 g of water is added, with simultaneous introduction of finely divided air in quantities of 10 liters per hour, the pH being maintained in a range from 7.5 to 8.5 by multiple additions of 30% strength aqueous sodium hydroxide solution. After 2 hours of subsequent reaction, neutralization is carried out with dilute phosphoric acid, and the solvent is removed by distillation. 500 g of ethanol are added to the distillation residue, and the solids are removed by filtration. The ethanol is removed by distillation. This gives the desired monosulphonated polyether monoalcohol in the form of a viscose liquid.

C) Preparation of the Hydrophilic Inventive Polyisocyanates (HPIC)

Example 6

Preparation of a Hydrophilic Polyisocyanate 340 g of Vestanat HT 2500/100 (isocyanurate of hexamethylene diisocyanate, EVONIK, NCO content 21.8%) are admixed in portions of 60 g of the emulsifier from Example 2. After 4 hours of heating at 100° C. with stirring, reaction is complete. After cooling, 0.1 g of benzoyl chloride is added. The NCO content is 17.6% and the viscosity (rotary viscometer, 23° C.) is 2.4 Pas.

Example 7

Preparation of a Hydrophilic Polyisocyanate 340 g of Vestanat HT 2500/100 (isocyanurate of hexamethylene diisocyanate, Evonik) are admixed in portions of 60 g of the emulsifier from Example 3. After 4 hours of heating at 100° C. with stirring, reaction is complete. After cooling, 0.1 g of benzoyl chloride is added. The NCO content is 17.8% and the viscosity (rotary viscometer, 23° C.) is 2.3 Pas.

D) Stability Investigations

The hydrophilic polyisocyanates (HPIC) prepared in Examples 6 and 7, and also comparison products (commercial products from Bayer, trade name Bayhydur, Examples I-III), are incorporated into water at 30% by weight by stirring with a high-speed stirrer (2 minutes at 1000 rpm and a further 1 minute at 1500 rpm). A measurement is made of the time which elapses before foaming occurs, an indicator of the end of the shelf life. The foaming is a sign of a vigorous NCO/water reaction with formation of $CO_2$. After foaming, the NCO content has dropped to 0%. In addition, the NCO contents are monitored at hourly intervals (based on initial value). In the table, therefore, the NCO contents prior to foaming are set out, in order to demonstrate that the dispersion is still intact at that point in time.

| HPIC | Elapsed time before foaming | NCO content before foaming |
| --- | --- | --- |
| Bayhydur 3100* I | 4.5 h | After 4 h: 80% |
| Bayhydur 305* II | 4.0 h | After 3 h: 91% |
| Bayhydur 304* III | 5.5 h | After 5 h: 92% |
| Example 6 | >10 h | After 10 h: 95% |
| Example 7 | 7.5 h | After 6 h: 92% |

*non-inventive, comparative examples (Bayhydur is a product name from Bayer)

Only the inventive hydrophilized polyisocyanates (HPIC) give a stability >6 h in water. The stability of the inventive HPIC is much higher than that of the commercially available comparison products.

E) Preparation of a Polyurethane Dispersion

Example 8

This dispersion is a physically drying PU dispersion based on VESTANAT IPDI.

Stage 1: Prepolymer Preparation by the Acetone Process:

| | |
| --- | --- |
| Isophorone diisocyanate (VESTANAT IPDI, Evonik) | NCO content: 37.7% |
| Oxyester T 1136 (Polyester, Evonik) | OH number: 113 mg KOH/g |
| Trimethylolpropane (TMP, Aldrich) | MW: 134 g/mol |
| Dimethylpropionic acid (DMPA, Aldrich) | MW: 134 g/mol |
| Dibutyltin dilaurate (DBTL, Aldrich) | |
| Acetone (Aldrich) | |
| Ethylenediamine (Aldrich) | MW: 60 g/mol |
| Triethylamine (Aldrich) | MW: 101 g/mol |
| Bayhydur 3100 (HPIC, Bayer) | 50% in water |

496.4 g of Oxyester T 1136, 50.2 g of DMPA, 13.4 g of TMP, 0.5 g of DBTL and 230 ml of acetone are introduced, homogenized at RT by stirring, and heated to 50° C.

This is followed by the addition of 346.3 g of VESTANAT IPDI over the course of around 20 minutes. The mixture is then heated to reflux and, after the DMPA has dissolved, is allowed to react until the theoretical NCO content (3.96%) is reached. The theoretical NCO content is reached after about 4 hours at around 65° C.

Stage 2: Dispersing:

To extend the amine, 27.3 g of a 20% strength solution of ethylenediamine in acetone are stirred rapidly within 15 seconds at RT into 482.9 g of the prepolymer from stage 1, producing a temperature increase of around 15° C. This is followed by neutralization with 10.1 g of triethylamine and the rapid addition of 480 ml of DI water, and subsequent stirring for around 30 seconds, with a subsequent reaction of 2 minutes. A hazy dispersion is obtained. The acetone solvent is removed on a rotary evaporator at 60° C.; time: around 1 hour. After cooling, the dispersion is filtered through a 50 μm filter.

F) Post-Crosslinking of the Polyurethane Dispersion from Example 8 by HPIC a) General preparation instructions for the 50% strength solution of a hydrophilic polyisocyanate (HPIC) in water The HPIC is introduced into DI water (1 part HPIC/1 part DI water). Using a wooden spatula, intense stirring is carried out by hand for around 30 seconds. This produces a solution, which is filtered through an 80μ filter.

b) General instructions for the addition of 5.0% HPIC to the polyurethane dispersion from Example 8:

The polyurethane dispersion from Example 8 is weighed out into a bottle, and 5.0% by weight of the 50% strength HPIC water solution from a) are weighed out into it. Using a wooden spatula, intense stirring is carried out for around 30 seconds. This produces a homogeneous dispersion. This dispersion is filtered through an 80μ filter and then knife-coated in a film thickness of 30-50 μm on to aluminium panels (Gardobond 722WOF). This coated panel is subsequently subjected to analytical testing, either after having been left to stand at room temperature or after having been dried (30 min @ 80° C.).

Procedures corresponding to a) and b) were carried out with Bayhydur 3100 (HPIC, Bayer) and with the HPIC from Example 6.

F) Coatings Data for the Post-Crosslinking of a Polyurethane Dispersion from Example 8

| HPIC | Curing | Dry time, min | Film thickness μm | Erichsen cupping | Peugeot | Pendulum hardness | | | Chemical resistance (7 d) | |
|---|---|---|---|---|---|---|---|---|---|---|
| | | | | | | 1 d | 2 d | 7 d | MEK | MeOH |
| None* | RT | 23 | 42-48 | 7.0 | 0 | 57 | 53 | 53 | 30 | 5 |
| | 30`80° C. | | 32-44 | 5.5 | 0 | 45 | 53 | 52 | 50 | 10 |
| Example 6 | RT | 25 | 32-57 | 7.0 | 0 | 42 | 61 | 66 | 130 | 45 |
| | 30`80° C. | | 37-57 | 7.0 | 0 | 43 | 67 | 74 | >150 | 100 |
| Bayhydur* 3100 | RT | 25 | 29-53 | 6.5 | 0 | 47 | 66 | 81 | 80 | 80 |
| | 30`80° C. | | 32-43 | 6.5 | 0 | 50 | 68 | 89 | >150 | 100 |

*non-inventive, comparative examples

Erichsen Cupping to DIN 53 156

Peugeot test to DIN EN ISO 2812-4 (premium-grade petrol is caused to act for 30" by dropwise addition, and is wiped off with a soft cloth). Assessment in accordance with DIN EN ISO 4628-1. These two DIN EN ISO specifications cross-reference one another.

KöNig Hardness (DIN 53 157)

MEK test, MeOH test: Solvent resistance test by rubbing with a cotton pad soaked in MEK (or MeOH, respectively), with a 1 kg applied weight, until the film dissolves (double rubs are the parameter counted).

On the basis of the post-crosslinking of a polyurethane dispersion from Example 8, it is clearly evident that the inventive HPIC from Example 6 has crosslinking properties similar to that of a commercial HPIC (Bayhydur 3100). The general coatings data (dust dry time, Erichsen cupping, Peugeot test, pendulum hardness) are at the same level within the bounds of measurement accuracy. In the case of the decisive chemical resistance, both are at the same level after 30 minutes @ 80° C. The resistance after 7 d of room temperature curing is in each case significantly higher than without crosslinker. The MEK resistance is somewhat higher when using HPIC from Example 6, while the Bayhydur 3100 has slight advantages in terms of methanol resistance.

Hence it has been shown that the HPICs of the invention possess a higher stability in water (C), with comparable reactivity (F), as compared with commercially available competitor products.

The invention claimed is:

1. A hydrophilic, water-soluble or water-dispersible polyisocyanate, comprising 4% to 27% by weight of isocyanate groups, said groups being aliphatically, cycloaliphatically, araliphatically and/or aromatically attached isocyanate groups,
    wherein the polyisocyanate has an average functionality of 2.0 to 5.0 and is synthesized from:
    A) at least one diisocyanate or polyisocyanate component having an average functionality of 2.0 to 5.0 and having 8% to 27% by weight of aliphatically, cycloaliphatically, araliphatically and/or aromatically attached isocyanate groups (calculated as NCO; molecular weight=42); and
    B) 0.3% to 25% by weight, based on the total weight of components A) and B), of at least one emulsifier (B) of the formula (1):

$$X-[y]-Z \qquad (1),$$

wherein:
    X represents one or more hydrophilic structural units formed from a substance class X', where X' comprises at least one group b) selected from the group consisting of a hydroxyalkylcarboxylic acid, a hydroxyalkylsulphonic acid, a hydroxypolyethersulphonic acid, and a hydroxyalkyl-N,N-dialkylamine of the formula $HO-R^2NR^3R^4$, wherein $R^2$ $R^3$ and $R^4$ independently represent alkyl groups having 1-18 carbon atoms, said group b) optionally branched or comprising a ring;
    y represents an optional spacer;
    Z represents one or more hydrophobic structural units;
    the emulsifier (B) comprises a functional group which is reactive towards isocyanate groups; and
    A) and B) are reacted with one another such that an equivalents ratio of NCO groups to functional groups which are reactive towards NCO groups of 2:1 to 400:1.

2. The polyisocyanate according to claim 1, wherein the functional group of emulsifier (B) which is reactive towards isocyanate groups comprises at least one selected from the group consisting of an OH group, an NH group, an NH2 group, an SH group, and C—H acidic group.

3. The polyisocyanate according to claim 1, wherein the emulsifier (B) comprises an isocyanate-reactive functional group located between X and Z.

4. The polyisocyanate according to claim 1, wherein the emulsifier (B) comprises structural constituents Z formed from a substance class Z', where Z' denotes at least one selected from the group consisting of
    a) a hydroxyl- or amino-terminated polyether comprising a polyglycol unit of formula: $R'O(CRHCH_2O)_n(CH_2CH_2O)_pR'$, wherein R represents a hydrocarbon radical of the formula: $(CH_2)_mCH_3$, where n and m independently represent 0-20, and p=0-5, such that n is greater than or equal to 4 times p, and R' independently represents H or alkyl having 1-18 carbon atoms,
    b) one or more hydroxy hydrocarbons having 1-18 carbon atoms, said hydroxy hydrocarbons being optionally branched, comprising rings, and/or comprising heteroatoms,
    c) an alkylene oxide, having at least 4 carbon atoms, said alkylene oxide being optionally branched and/or comprising rings.

5. The polyisocyanate according to claim 1, wherein X comprises polyether radicals and a sulphonic acid group, and Z comprises a hydrocarbon radical having 3 to 18 carbon atoms, and an alcohol group.

6. The polyisocyanate according to claim 5, wherein the emulsifier (B) is formed by reacting a starting material of the formula:

$$HO-R^7,$$

wherein $R^7$ is a monovalent, at least monounsaturated, aliphatic hydrocarbon radical having 3 to 18, a preferably monounsaturated cycloaliphatic or mixed cyloaliphatic/aliphatic hydrocarbon radical having 4 to 10 carbon atoms, or is an aromatic or araliphatic hydrocarbon radical having a total of 8 to 16 carbon atoms, said starting material having an olefinically unsaturated substituent whose double bond is not in conjugation with the aromatic ring,
with
   a) ethylene oxide and/or propylene oxide, to form polyethers a), and subsequently reacting
   b) the polyethers a) with epoxides of the formula (4):

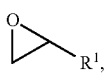   (4)

wherein $R^1$ represents a saturated, unsaturated, branched or unbranched, hydrocarbon radical having at least 2 carbon atoms,
to form polyethers b), and optionally reacting
   c) the polyethers b) with ethylene oxide,
to form monounsaturated polyether monoalcohols, and reacting
   d) the monounsaturated polyether monoalcohols with compounds of the formula $HSO_3M$, where M denotes a metal ion or ammonium ion.

7. The polyisocyanate according to claim 1, wherein the component A) has an average NCO functionality of 2.0 to 5.0, an isocyanate groups content of 8% to 27% by weight and a monomeric diisocyanates content of less than 1% by weight.

8. The polyisocyanate according to claim 1, wherein the component A), or a precursor of the component A), is selected from the group consisting of 1,4-diisocyanatobutane, 1,6-diisocyanatohexane (HDI), 2-methyl-1,5-diisocyanatopentane, 1,5-diisocyanato-2,2-dimethylpentane, 2,2,4-trimethyl-1,6-diisocyanatohexane, 2,4,4-trimethyl-1,6-diisocyanatohexane, 1,10-diisocyanatodecane, 1,3-diisocyanatocyclohexane, 1,4-diisocyanatocyclohexane, 1,3-bis(isocyanatomethyl)cyclohexane, 1,4-bis(isocyanatomethyl)cyclohexane, 1-isocyanato-3,3,5-trimethyl-5-isocyanatomethylcyclohexane (isophorone diisocyanate, IPDI), 2,2'-diisocyanatodicyclohexylmethane, 2,4'-diisocyanatodicyclohexylmethane, 4,4'-diisocyanatodicyclohexylmethane ($H_{12}$MDI), 1-isocyanato-1-methyl-4(3)isocyanatomethylcyclohexane, bis(isocyanatomethyl)norbornane, 1,3-bis(2-isocyanatoprop-2-yl)benzene (TMXDI), 1,4-bis(2-isocyanatoprop-2-yl)benzene (TMXDI), 2,4-diisocyanatotoluene (TDI), 2,6-diisocyanatotoluene (TDI), 2,4'-diisocyanatodiphenylmethane (MDI), 4,4'-diisocyanatodiphenylmethane (MDI), 1,5-diisocyanatonaphthalene, and mixtures thereof.

9. The polyisocyanate according to claim 1, wherein the component A) is at least one polyisocyanate comprising at least one group selected from the group consisting of a uretdione, an isocyanurate, an allophanate, a biuret, a urea, a urethane, an iminooxadiazinedione, and an oxadiazinetrione.

10. The polyisocyanate according to claim 1, wherein the component A) is at least one selected from the group consisting of HDI, IPDI, and $H_{12}$MDI.

11. A process for preparing a hydrophilic, water-soluble or water-dispersible polyisocyanate, the process comprising reacting:
   A) at least one diisocyanate or polyisocyanate component having an average functionality of 2.0 to 5.0 and having 8% to 27% by weight of aliphatically, cycloaliphatically, araliphatically and/or aromatically attached isocyanate groups (calculated as NCO; molecular weight=42); with
   B) 0.3% to 25% by weight, based on the total weight of components A) and B), of at least one emulsifier of the formula (1):

X-[y]-Z     (1), wherein:
X represents one or more hydrophilic structural units formed from a substance class X', where X' comprises at least one group b) selected from the group consisting of a hydroxyalkylcarboxylic acid, a hydroxyalkylsulphonic acid, a hydroxypolyethersulphonic acid, and a hydroxyalkyl-N,N-dialkylamine of the formula HO—$R^2NR^3R^4$, wherein $R^2$ $R^3$ and $R^4$ independently represent alkyl groups having 1-18 carbon atoms, said group b) optionally branched or comprising a ring;
y represents an optional spacer;
Z represents one or more hydrophobic structural units;
the emulsifier (B) comprises a functional group which is reactive towards isocyanate groups;
A) and B) are reacted with one another in an equivalents ratio of NCO groups to functional groups which are reactive towards NCO groups of 2:1 to 400:1;
the polyisocyanate has an average functionality of 2.0 to 5.0; and
the polyisocyanate comprises 4% to 27% by weight of isocyanate groups, said groups being aliphatically, cycloaliphatically, araliphatically and/or aromaticaly attached isocyanate groups.

12. A polyurethane polymer, comprising the polyisocyanate according to claim 1, said polymer being suitable as a crosslinker.

13. A crosslinker, comprising the polyisocyanate according to claim 1, said crosslinker being suitable for water-soluble or water-dispersible film-forming binders or film-forming binder components.

14. A coating, comprising the polyisocyanate according to claim 1, said coating formed from aqueous coating materials based on binders or binder components.

15. A process, comprising reacting the polyisocyanate according to claim 1 in blocked form as a reaction component in water-dispersible or water-dispersed film-forming binders or film-forming binder components.

16. An adjuvant, comprising the a polyisocyanate according to claim 1, said adjuvant suitable for aqueous polyurethane dispersions.

17. A hydrophilic, water-soluble or water-dispersible polyisocyanate, comprising 4% to 27% by weight of isocyanate groups, said groups being aliphatically, cycloaliphatically, araliphatically and/or aromatically attached isocyanate groups,
   wherein the polyisocyanate has an average functionality of 2.0 to 5.0 and is synthesized from:
   A) at least one diisocyanate or polyisocyanate component having an average functionality of 2.0 to 5.0 and having 8% to 27% by weight of aliphatically, cycloaliphatically, araliphatically and/or aromatically attached isocyanate groups (calculated as NCO; molecular weight=42); and
   B) 0.3% to 25% by weight, based on the total weight of components A) and B), of at least one emulsifier (B) of the formula (1):

X-[y]-Z     (1), wherein:
X represents one or more hydrophilic structural units wherein X comprises polyether radicals and a sulphonic acid group, and Z comprises a hydrocarbon radical having 3 to 18 carbon atoms, and an alcohol group;

y represents an optional spacer;

the emulsifier (B) comprises a functional group which is reactive towards isocyanate groups; and A) and B) are reacted with one another such that an equivalents ratio of NCO groups to functional groups which are reactive towards NCO groups of 2:1 to 400:1.

18. The polyisocyanate according to claim 17, wherein the functional group of emulsifier (B) which is reactive towards isocyanate groups comprises at least one selected from the group consisting of an OH group, an NH group, an NH2 group, an SH group, and C—H acidic group.

19. The polyisocyanate according to claim 17, wherein the emulsifier (B) comprises an isocyanate-reactive functional group located between X and Z.

20. The polyisocyanate according to claim 17, wherein the emulsifier (B) is formed by reacting a starting material of the formula:

HO—R⁷, wherein $R^7$ is a monovalent, at least monounsaturated, aliphatic hydrocarbon radical having 3 to 18, a preferably monounsaturated cycloaliphatic or mixed cyloaliphatic/aliphatic hydrocarbon radical having 4 to 10 carbon atoms, or is an aromatic or araliphatic hydrocarbon radical having a total of 8 to 16 carbon atoms, said starting material having an olefinically unsaturated substituent whose double bond is not in conjugation with the aromatic ring, with
a) ethylene oxide and/or propylene oxide, to form polyethers a), and subsequently reacting b) the polyethers a) with epoxides of the formula (4):

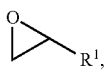

(4)

wherein $R^1$ represents a saturated, unsaturated, branched or unbranched, hydrocarbon radical having at least 2 carbon atoms, to form polyethers b), and optionally reacting c) the polyethers b) with ethylene oxide, to form monounsaturated polyether monoalcohols, and reacting d) the monounsaturated polyether monoalcohols with compounds of the formula $HSO_3M$, where M denotes a metal ion or ammonium ion.

21. The polyisocyanate according to claim 17, wherein the component A) has an average NCO functionality of 2.0 to 5.0, an isocyanate groups content of 8% to 27% by weight and a monomeric diisocyanates content of less than 1% by weight.

22. The polyisocyanate according to claim 17, wherein the component A), or a precursor of the component A), is selected from the group consisting of 1,4-diisocyanatobutane, 1,6-diisocyanatohexane (HDI), 2-methyl-1,5-diisocyanatopentane, 1,5-diisocyanato-2,2-dimethylpentane, 2,2,4-trimethyl-1,6-diisocyanatohexane, 2,4,4-trimethyl-1,6-diisocyanatohexane, 1,10-diisocyanatodecane, 1,3-diisocyanatocyclohexane, 1,4-diisocyanatocyclohexane, 1,3-bis(isocyanatomethyl)cyclohexane, 1,4-bis(isocyanatomethyl)cyclohexane, 1-isocyanato-3,3,5-trimethyl-5-isocyanatomethylcyclohexane (isophorone diisocyanate, IPDI), 2,2'-diisocyanatodicyclohexylmethane, 2,4'-diisocyanatodicyclohexylmethane, 4,4'-diisocyanatodicyclohexylmethane ($H_{12}MDI$), 1-isocyanato-1-methyl-4(3)isocyanatomethylcyclohexane, bis(isocyanatomethyl)norbornane, 1,3-bis(2-isocyanatoprop-2-yl)benzene (TMXDI), 1,4-bis(2-isocyanatoprop-2-yl)benzene (TMXDI), 2,4-diisocyanatotoluene (TDI), 2,6-diisocyanatotoluene (TDI), 2,4'-diisocyanatodiphenylmethane (MDI), 4,4'-diisocyanatodiphenylmethane (MDI), 1,5-diisocyanatonaphthalene, and mixtures thereof.

23. The polyisocyanate according to claim 17, wherein the component A) is at least one polyisocyanate comprising at least one group selected from the group consisting of a uretdione, an isocyanurate, an allophanate, a biuret, a urea, a urethane, an iminooxadiazinedione, and an oxadiazinetrione.

24. The polyisocyanate according to claim 17, wherein the component A) is at least one selected from the group consisting of HDI, IPDI, and $H_{12}MDI$.

* * * * *